(12) United States Patent
Handler

(10) Patent No.: US 7,162,446 B1
(45) Date of Patent: Jan. 9, 2007

(54) INTEGRATED AUCTION

(75) Inventor: Brad Handler, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 09/457,466

(22) Filed: Dec. 8, 1999

Related U.S. Application Data (60) Provisional application No. 60/111,717, filed on Dec. 8, 1998.

(51) Int. Cl.
G06F 17/00 (2006.01)

(52) U.S. Cl. .............................. 705/37; 705/27; 705/26

(58) Field of Classification Search ................. 705/37, 705/80, 26, 1, 40, 27
See application file for complete search history.

(56) References Cited

U.S. PATENT DOCUMENTS

| | | | |
|---|---|---|---|
| 3,573,747 A | 4/1971 | Adams | |
| 3,581,072 A | 5/1971 | Nymayer | |
| 4,412,287 A | * 10/1983 | Braddock, III | 364/408 |
| 4,674,044 A | 6/1987 | Kalmus et al. | |
| 4,677,552 A | 6/1987 | Sibley, Jr. | |
| 4,789,928 A | * 12/1988 | Fujisaki | 705/37 |
| 4,799,156 A | 1/1989 | Shavit et al. | |
| 4,823,265 A | 4/1989 | Nelson | |
| 4,864,516 A | 9/1989 | Gaither et al. | 364/518 |
| 4,903,201 A | 2/1990 | Wagner | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |

(Continued)

FOREIGN PATENT DOCUMENTS

CA 2253543 3/1997

(Continued)

OTHER PUBLICATIONS

"Auction House Moves For Internet Business", Internet Business News. Dialog File 636, Access No. 02809791, Aug. 1995.*

(Continued)

*Primary Examiner*—Elisca Pierre Eddy
(74) *Attorney, Agent, or Firm*—Schwegman, Lundberg, Woessner & Kluth, P.A.

(57) ABSTRACT

A method and apparatus are provided for conducting an integrated auction that incorporates various features of traditional and online auctions. According to one aspect of the present invention, the integrated auction includes a live, in-person auction component and an online bidding environment component. Bidding information associated with an item in the online bidding environment is updated to reflect a current bid associated with the item in the live, in-person auction. During the live, in-person auction, a bid is accepted from an online bidder in the online environment that reflects a maximum price the online bidder is willing to pay for the item. Subsequently, the system bids on behalf of the online bidder against one or more live bidders that are participating in the live, in-person auction based upon the maximum price.

22 Claims, 6 Drawing Sheets

U.S. PATENT DOCUMENTS

| | | | |
|---|---|---|---|
| 5,329,589 A | 7/1994 | Fraser et al. | |
| 5,375,055 A | 12/1994 | Togher et al. | |
| 5,394,324 A | 2/1995 | Clearwater | |
| 5,426,281 A | 6/1995 | Abecassis | |
| 5,485,510 A | 1/1996 | Colbert | |
| 5,539,450 A | 7/1996 | Handelman | |
| 5,553,145 A | 9/1996 | Micali | |
| 5,557,728 A | 9/1996 | Garrett et al. | 395/157 |
| 5,596,994 A | 1/1997 | Bro | |
| 5,598,557 A | 1/1997 | Doner et al. | 395/605 |
| 5,640,569 A | 6/1997 | Miller et al. | |
| 5,657,389 A | 8/1997 | Houvener | |
| 5,664,115 A | 9/1997 | Fraser | |
| 5,689,652 A | 11/1997 | Lupien et al. | |
| 5,694,546 A | 12/1997 | Reisman | 395/200.9 |
| 5,706,457 A | 1/1998 | Dwyer et al. | 395/349 |
| 5,710,889 A | 1/1998 | Clark et al. | |
| 5,715,314 A | 2/1998 | Payne et al. | |
| 5,715,402 A | 2/1998 | Popolo | |
| 5,717,989 A | 2/1998 | Tozzoli et al. | |
| 5,722,418 A | 3/1998 | Bro | |
| 5,727,165 A | 3/1998 | Ordish et al. | |
| 5,737,599 A | 4/1998 | Rowe et al. | 395/615 |
| 5,760,917 A | 6/1998 | Sheridan | |
| 5,761,655 A | 6/1998 | Hoffman | |
| 5,771,291 A | 6/1998 | Newton et al. | |
| 5,771,380 A | 6/1998 | Tanaka et al. | 395/615 |
| 5,790,790 A | 8/1998 | Smith et al. | |
| 5,794,216 A | 8/1998 | Brown | 705/27 |
| 5,794,219 A | 8/1998 | Brown | |
| 5,799,285 A | 8/1998 | Klingman | |
| 5,803,500 A | 9/1998 | Mossberg | |
| 5,818,914 A | 10/1998 | Fujisaki | |
| 5,826,244 A | 10/1998 | Huberman | |
| 5,835,896 A * | 11/1998 | Fisher et al. | 705/37 |
| 5,845,265 A * | 12/1998 | Woolston | 705/37 |
| 5,845,266 A | 12/1998 | Lupien et al. | |
| 5,850,442 A | 12/1998 | Muftic | |
| 5,872,848 A | 2/1999 | Romney et al. | |
| 5,873,069 A | 2/1999 | Reuhl et al. | |
| 5,884,056 A | 3/1999 | Steele | 395/339 |
| 5,890,138 A | 3/1999 | Godin et al. | 705/26 |
| 5,905,974 A | 5/1999 | Fraser et al. | |
| 5,905,975 A * | 5/1999 | Ausubel | 705/37 |
| 5,922,074 A | 7/1999 | Richard et al. | |
| 5,924,072 A | 7/1999 | Havens | |
| 5,926,794 A | 7/1999 | Fethe | |
| 5,974,398 A | 10/1999 | Hanson et al. | |
| 5,974,412 A | 10/1999 | Hazlehurst | |
| 5,991,739 A | 11/1999 | Cupps et al. | |
| 6,012,045 A | 1/2000 | Barzilai et al. | |
| 6,023,685 A | 2/2000 | Brett et al. | |
| 6,035,288 A | 3/2000 | Solomon | |
| 6,035,402 A | 3/2000 | Vaeth et al. | |
| 6,044,363 A | 3/2000 | Mori et al. | |
| 6,047,264 A | 4/2000 | Fisher et al. | |
| 6,055,518 A | 4/2000 | Franklin et al. | |
| 6,058,417 A | 5/2000 | Hess et al. | |
| 6,061,448 A | 5/2000 | Smith et al. | |
| 6,073,117 A | 6/2000 | Oyanagi et al. | |
| 6,078,906 A * | 6/2000 | Huberman | 705/37 |
| 6,085,176 A | 7/2000 | Woolston | |
| 6,104,815 A | 8/2000 | Alcorn et al. | |
| 6,119,137 A | 9/2000 | Smith et al. | |
| 6,141,653 A * | 10/2000 | Conklin et al. | 705/80 |
| 6,178,408 B1 | 1/2001 | Copple et al. | |
| 6,192,407 B1 | 2/2001 | Smith et al. | |
| 6,202,051 B1 | 3/2001 | Woolston | |
| 6,243,691 B1 * | 6/2001 | Fisher et al. | 705/37 |
| 6,415,269 B1 | 7/2002 | Dinwoodie | |
| 6,449,601 B1 | 9/2002 | Friedland et al. | |
| 6,523,037 B1 | 2/2003 | Monahan et al. | |
| 2003/0131006 A1 | 7/2003 | Monahan et al. | |
| 2006/0112003 A1 | 5/2006 | Levy et al. | |

FOREIGN PATENT DOCUMENTS

| | | | |
|---|---|---|---|
| FR | 2658635 A1 | | 6/1991 |
| FR | 2658635 | | 8/1991 |
| JP | 04-342065 | | 11/1992 |
| JP | 10-229555 | | 8/1998 |
| JP | 02005050288 A | * | 2/2005 |
| KR | 20000037331 A | | 7/2000 |
| NL | 9300266 | | 2/1993 |
| NL | 9300266 | | 10/1993 |
| US | 99/18510 | | 10/1998 |
| US | 00/32088 | | 4/2001 |
| WO | WO 92/15174 | | 9/1992 |
| WO | WO 94/22108 | | 9/1994 |
| WO | WO 95/17711 | | 6/1995 |
| WO | WO 96/34356 | | 10/1996 |
| WO | WO 97/37315 | | 10/1997 |
| WO | WO-9737315 A1 | | 10/1997 |
| WO | WO 98/34187 | | 6/1998 |
| WO | WO 98/35468 | | 8/1998 |
| WO | WO9834187 | * | 8/1998 |
| WO | WO 99/63461 | | 5/1999 |
| WO | WO99/63461 | * | 12/1999 |
| WO | WO 99/63461 | | 12/1999 |
| WO | WO-0022907 A2 | | 4/2000 |
| WO | WO-0025218 | | 5/2000 |
| WO | WO-0039735 A2 | | 7/2000 |
| WO | WO-0141013 | | 6/2001 |

OTHER PUBLICATIONS

"Bid.com Announces www.dutchauction.com", Business Wire, p1464. Dialog File 16, Access No. 05914806, Oct. 1998.*

Cooper, J., "Going Going Gone! Tradition gives way to technology", British Telecom World, Dialog File 148, Access No. 04587041, Mar. 1990.*

Dunlap, C."Going Once, Going Twice. . . Sold!", Computer Reseller News, n766 PP:1, Dialog File 16, Access No. 01544740, Dec. 1997.*

"MOAI Technologies Announce LiveExchange 2.1" PR Newswire. Dialog File 20, Access No. 02803594, Sep. 14, 1998.*

Bid Message Processing for Real-Time Auctions; Friedland noah S.*

An empirical analysis of the limit order book and the order flow in the Paris Bourse; Biais bruno et al. Dec. 1995.*

Biais Bruno; Title: An Empirical analysis of the limit order book and the order flow in the Paris Bourse; Dec. 1995.*

PCT/US99/18510 filing date Aug. 12, 1999, 4 pages.

Yahoo Auctions Website, download Oct. 23, 1998 from www.auctions.yahoo.com, 5 pages.

Onsale Auction Website, download Oct. 23, 1998 from www.onsale.com, 3 pages.

Netgrocer Website, downloaded Oct. 23, 1998 from Website www.netgrocer.com, 3 pages.

Auction Universe Website, downloaded Oct. 23, 1998 from www.auctionuniverse.com, 6 pages.

European Patent Office Search Report, RS 102472 US, 4 pages.

Hong et al,"Multilingual Information Retrieval Systems", Multimedia Storage and Archivings System,Nov. 18-19, 1996, 16 pages.

Liepins et al., "A Browser Based Image Bank, Useful Tool or Expensive Toy", MEDNET 97, Nov. 1997, 11 pages.

Mohan, "Text-Based Search of TV News Stories", Multimedia Storage and Archiving Systems, Nov. 18-19, 1996, 16 pages.

Preist et al., "Adaptive Agents in a Persistent Shout Double Auction", ACM International Conference on Information and Computation Economies, Oct., 1998, pp. 11-18.

PCT International Search Report, PCT/US99/29312, Apr. 18, 2000, 6 pages.

Chris Preist, Marten van Tol, "International Conference on Information and Computation Economies", *Adaptive Agents in a Persistant Shout Double Auction*, (c) 1999, pp. 2.

Malone, TW; Yates, J; et al., "Electrnic Markets and Electronic Hierarchies", *Communications—of the ACM*, Jun. 1987, pp. 484-497, vol. 30, No. 6, USA.

Warbelow, A; Kokuryo, J, "Aucnet: TV Auction Network System". *Harvard Business School Case/Study*, Jul. 1989, pp. 1-15, HBVR# 9-190-001, USA.

"Personal Optimized Decision/Transaction Program", *IBM Technocal Disclosure Bulletin*, Jan. 1995, pp. 83-84, vol. 38, No. 1, USA.

NEO, BS, "The Implementation of an electronic market for pig trading in Singapore", *Journal of Strategic Information Systems*, Dec. 1992, pp. 278-288, vol. 1, No. 5.

Rockoff, Te; Groves, M., "Design of an Internet-based system for remote Dutch auctions", *Internet Reaearch—Electrnic Networking Applications and Policy*, Jan. 1, 1995, vol. 5, No. 4, pp. 10-16.

Massimb, MN; Phelps, BD, "Electronic Trading, Market Structure and Liquifity", *Financial Analysts Journal*, Jan.-Feb. 1994, vol. 50, No. 1, pp. 39-50, Charlottesville, Virginia.

Post, DL; Coppinger, SS, et al., "Application of Auction as a Pricing Mechinism for the Interchange of Electric Power", *IEEE Transactions on Power Systems*, Aug. 1995, pp. 7, vol. 10, No. 3.

Hess, CM; Kemerer, CF., "Computerized Loan Organization System: An Industry Case Study of the Electronic Markets Hypothesis", *MIS Quarterly*, Sep. 1994, vol. 18, No. 3, pp. 251-274.

Reck, Martin, "Formally Specifying and Automated Trade Execution System", *Journal of Systems and Software*, 1993, pp. 245-252, vol. 21, Elsevier Science Publishing Co., Inc. New York, Ny.

"Anonymous Delivery of Goods in Electronic Commerce", *IBM Technocal Disclosure Bulletin*, Mar. 1996, pp. 363-366, vol. 39, No. 3.

Lee, G., "Electronic Brokerage and Electronic Auction: The Impact of IT on Market Structures", *Proceedings of the 29th HICSS*, 1996, pp. 397-406, vol. IV.

Clemins, E; Weber, B., "Evaluating the Prospects for Alternative Electronic Securities Markets", *International Conference on Information Systems*, 1991, pp. 53-61, vol. 12.

Mardesich, J., "Onsale Takes Auction gavel electronic", *Computer Reseller News*, Jul. 8, 1996, p. 2 continued on p. 32, Mountain View, California.

"Onsale joins fray as online shopping picks up speed: Internet Booms", *Computer Reseller News*, Jun. 5, 1995, p. 73, CMP Publications, Inc., USA.

Siegmann, Ken, "Nowhere to go but up", *PC Week*, Oct. 23, 1995, p. 1-3, vol. 12, No. 42, Ziff-Davis Publishing Company.

"Onsale: Onsale Brings Thrill of Auctions and Bargain Hunting Online; Unique Internet retail service debuts with week-long charity auction for the Computer Museum in Boston", May 24, 1995, pp. 3.

Schmid, BF., "The Development of Electronic Commerce", *Newsletter of the Competence Centre Electric Markets*, Oct. 1993, No. 9/10.

Tjostheim, I; EIDE, J., "A Case study of an on-line auction for the World Wide Web", *Norwegian Computing Center*, No Date Given, pp. 1-10.

Graham, I., "The Emergence of Linked Fish Markets in Europe", *Focus Theme,* No Date Given, pp. 1-3.

Rech, Martin.,"Trasing-Process Characteristics of Electronic Auctions", *Focus Theme*, No Date Given, pp. 1-7.

Van Heck, E; Ribbers, PM., "Experiences with Electronic Auctions in the Dutch Flower Industry", *Focus Theme*; No date Given, pp. 1-6.

Lee, HG., "Aucnet: Electronic Intermediary for Used-car Transactions", *Focus Theme*, No Date Given, pp. 1-5.

Klein, S., "Introduction to Electronic Auctions", *Focus Theme*, No Date Given, pp. 1-4.

Turban, E., "Auctions and Bidding on the Internet an Assessment", *Focus Theme*, No Date Given, pp. 1-5.

Zwass, Vladimir., "Electronic Commerce: Structures and Issues", *International Journal of Electrnic Commerce*, Fall 1996, pp. 3-23, vol., 1, No. 1.

PCT Notification of Transmittal of the International Search Report or the Declaration, mailed Nov. 16, 2000.

PCT Notification of the International Search Report or the Declaration, mailed Aug. 27, 2001.

Resnich, Paul; Zeckhauser, Richard; Friedman, Eric; Kuwabara, Ko, "Reputation Systems", Association for Computing Machinery, *Communications of ACM,* V. 43 N. 12, PP45-48, Dec. 2000.

Meade, Jim; "Visual 360: A Performance Appraisal System That's Fun", *HR Magazine*, 44, 7, 118(3), Jul. 1999.

MEDIAPRAISE: Mediapraise Receives National Award for Web-based Technology that Enables Companies to Solve Thorny HR Problem Raleigh, NC (Business Wire), Dec. 14, 1998.

Beam, Carrie, et al., "Automated Negotiations: A Survey of the State of the Art", *Fisher Center for Information Technology & Management-Walter A. Haas School of Business*, 14 Pages.

Beam, Carrie, et al., "Electronic Negotiation through Internet-based Auctions", *CITM Working Paper 96-WP-1019, Fisher Center for Information Technology & Management-Walter A. Haas School of Business*, (Dec. 1996),39 Pages.

Kikuchi, Hiroaki, et al., "Multi-Round Anonymous Auction Protocols", *IEICE Trans. Inf. & Syst., vol. E82-D, No. 4*, (Apr. 1999),769-777.

Ootake, T., "Monthly Turnover of Ten Million Yen Through Auctions: Stake on EC by Introducing a New System", *Orient Corporation, Nikkei Multimedia*, (Aug. 15, 1998),92-97.

Teich, Jeffrey, et al., "Multiple-issue auction and market algorithms for the world wide web", *Decision Support Systems, vol. 26*, (1999),49-66.

\* cited by examiner

INTEGRATED AUCTION

This application claims the benefit of U.S. Provisional Application No. 60/111,717, filed Dec. 8, 1998.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The invention relates generally to the fields of auctioning and online commerce. More particularly, the invention relates to an integrated auction format that incorporates features of both Internet and traditional, real world auctions.

BACKGROUND OF THE INVENTION

With the advent of online auctioning pioneered by eBay Inc., the assignee of the present invention, more and more Internet users are realizing the ease and convenience of buying items online. As the leading person-to-person trading site, buyers are compelled to trade on eBay's web site due to the large amount of content available. Similarly, sellers are attracted to eBay to conduct business where there are the most buyers. Ebay currently provides over two million new auctions, and 250,000 new items every day from which users may choose.

Auction houses that run live, real-time, on-site auctions ("traditional auctions") continue to experience much success. However, geographic barriers, travel costs, and other constraints limit the participation in such auctions.

It is desirable, therefore, to expand the reach of traditional auctions via the Internet. In particular, it would be advantageous to incorporate the best of both Internet and traditional auctions into an integrated auction format.

BRIEF SUMMARY OF THE INVENTION

A method and apparatus are described for conducting an integrated auction that incorporates various features of traditional and online auctions. According to one aspect of the present invention, the integrated auction includes a live, in-person auction component and an online bidding environment component. Bidding information associated with an item in the online bidding environment is updated to reflect a current bid associated with the item in the live, in-person auction. During the live, in-person auction, a bid may be accepted from an online bidder in the online environment that reflects a maximum price the online bidder is willing to pay for the item. Subsequently, the system bids on behalf of the online bidder against one or more live bidders that are participating in the live, in-person auction based upon the maximum price.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which.

DETAILED DESCRIPTION

A method and apparatus are described for carrying out an integrated auction that incorporates various features of traditional and online auctions. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

As will be described in greater detail below, the present invention includes features that seek to enhance the traditional auctioning experience. According to one embodiment, an integrated auction incorporates various features of traditional and Internet auctions (also referred to as online auctions). In a first stage of the integrated auction, e.g., the "pre-auction bidding stage," a starting bid for a traditional, live auction may be established based upon bids received from online bidders. Subsequently, in a second stage of the integrated auction, e.g., the "live auction stage," a live auction is conducted by an auction house, such as Guernsey's, using the highest bid from the pre-auction bidding stage. During the live auction stage, bidding information is updated on the online auction site and online bidders may submit additional maximum proxy amounts. Finally, in an optional third stage of the integrated auction, e.g., the "proxy showdown stage," if an online bidder's maximum proxy price is greater than the highest bid from the live auction stage, then the integrated auction returns to the live auction until the proxy price has been met. Advantageously, in this manner, the reach of traditional auctions may be expanded via the Internet.

In the preferred embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Client-Server Environment

Figure 1:
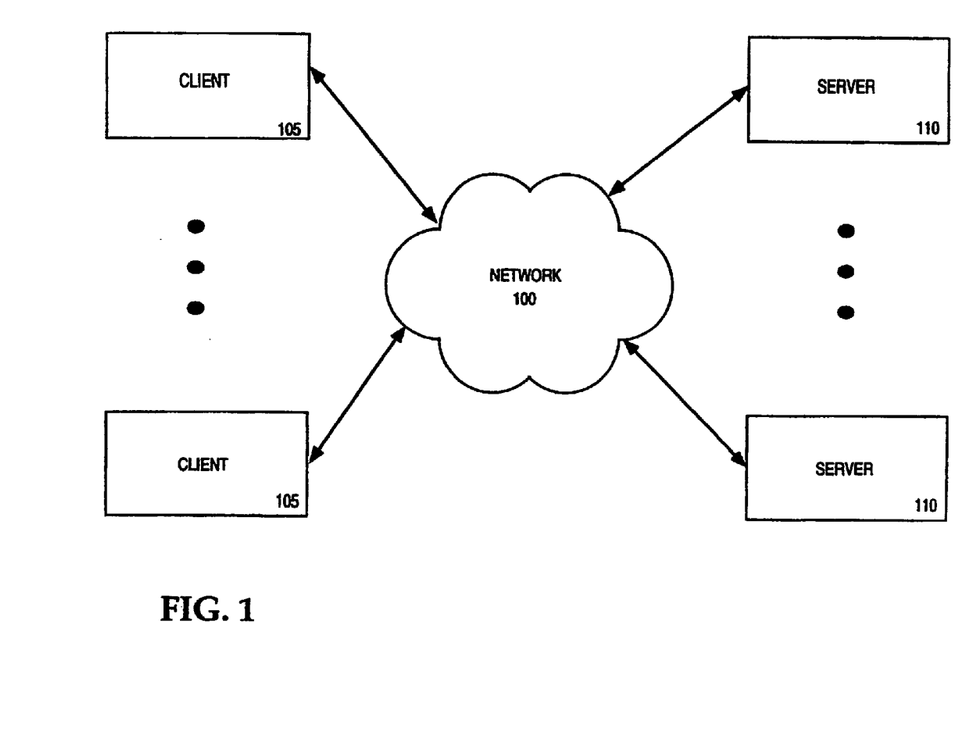
FIG. 1 is a simplified view of an exemplary client-server environment in which the online portion of an integrated auction may occur according to one embodiment of the present invention.

FIG. 1 is a simplified view of an exemplary client-server environment, such as the World Wide Web (the Web), in which the online portion of an integrated auction may take place. The architecture of the Web follows a conventional client-server model. The terms "client" and "server" are used to refer to a computer's general role as a requester of data (the client) or provider of data (the server). Web clients 105 and Web servers 110 communicate using a protocol such as HyperText Transfer Protocol (HTTP). In the Web environment, Web browsers reside on clients and render Web documents (pages) served by the Web servers. The client-server model is used to communicate information between clients 105 and servers 110. Web servers 110 are coupled to the Internet 100 and respond to document requests and/or other queries from Web clients 105. When a user selects a document by submitting its Uniform Resource Locator (URL), a Web browser, such as Netscape Navigator or Internet Explorer, opens a connection to a server 110 and initiates a request (e.g., an HTTP get) for the document. The server 110 delivers the requested document, typically in the form of a text document coded in a standard markup language such as HyperText Markup Language (HTML).

Exemplary Online Auctioning Site Interface

Figure 2:
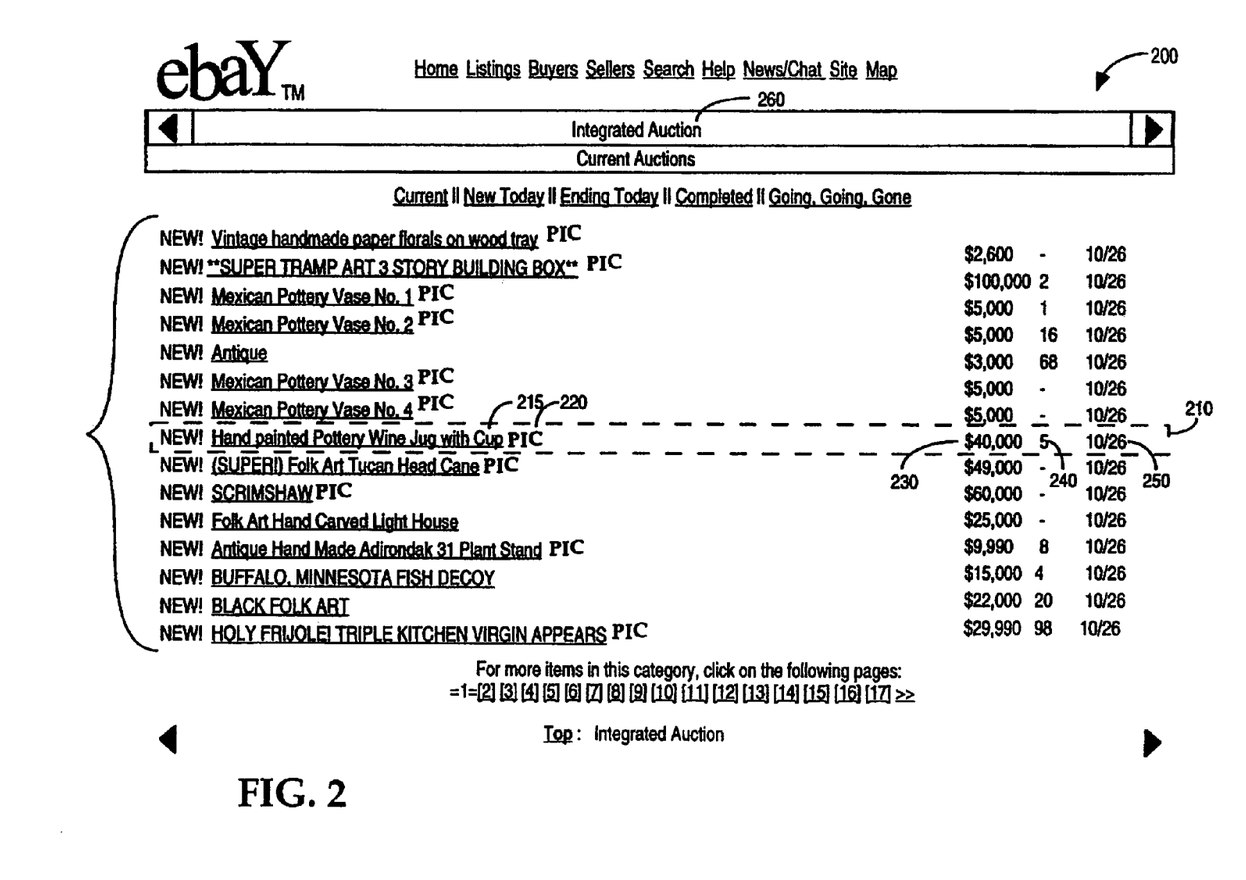
FIG. 2 is an exemplary online auction site screen that allows online bidders to participate in an integrated auction according to one embodiment of the present invention.

FIG. 2 is an exemplary online auction site screen that allows online bidders to participate in an integrated auction. According to one embodiment, when an online bidder requests to view items associated with an integrated auction, screen 200 is presented with a textual list of items 205. In this example, each item 210 includes a hypertext link 215 having a title (or brief description) of the item for sale, an indication 220 of whether or not an image of the item is available, the current minimum bid 230, the number of bids received 240, and an auction ending date and/or time 250. Responsive to the selection of the hypertext link 215, a subsequent screen (not shown) may prompt the online bidder to enter his/her maximum bid for the item 210. As will be described further below, by providing a maximum bid amount, a proxy bidding system may bid on behalf of the online bidder as necessary by increasing the online bidder's bid by the current bid increment until the maximum is reached. Advantageously, in this manner, the online bidder need not keep track of the auction as it proceeds and is assured he/she will not be outbid at the last minute—unless the maximum specified is exceeded.

Exemplary Computer System

Figure 3:
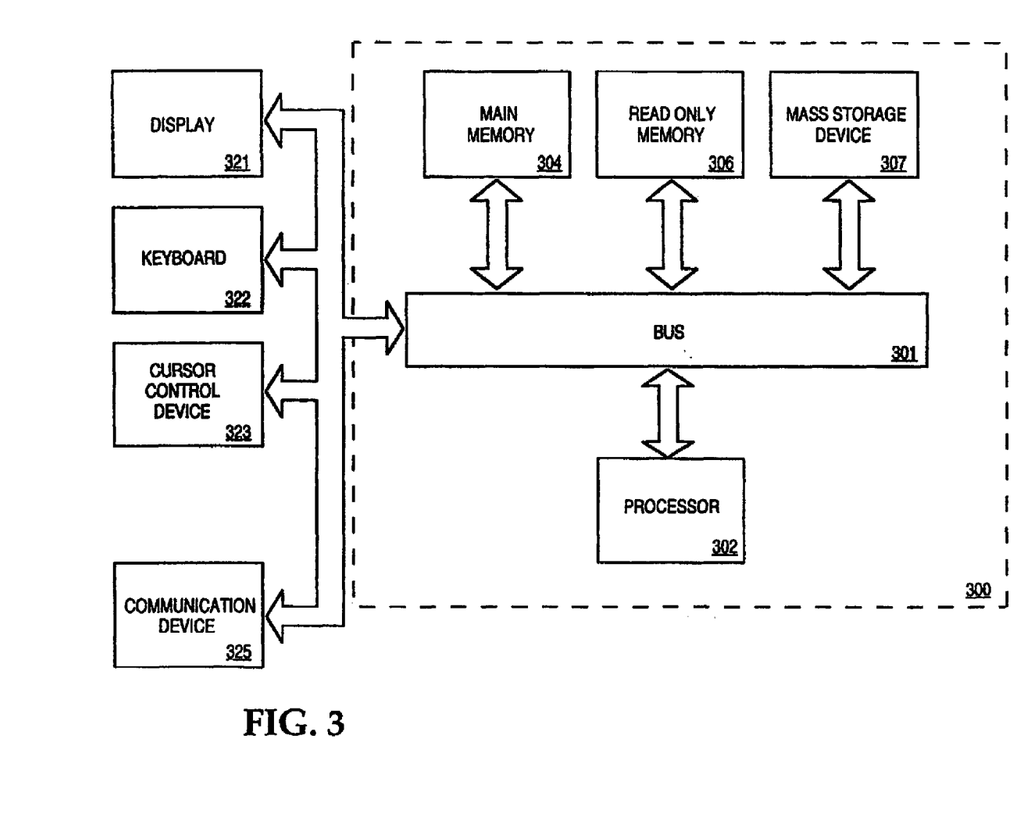
FIG. 3 is an example of a computer system upon which one embodiment of the present invention may be implemented.

A computer system 300 representing an exemplary server in which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for accessing remote servers via the Internet, for example. The communication device 325 may include a modem, a network interface card, or other commercially available network interface devices, such as those used for coupling to an Ethernet, token ring, or other type of network. In any event, in this manner, the computer system 300 may be coupled to a number of clients and/or other servers via a conventional network infrastructure, such as a company's Intranet and/or the Internet, for example.

System Overview

Figure 4:
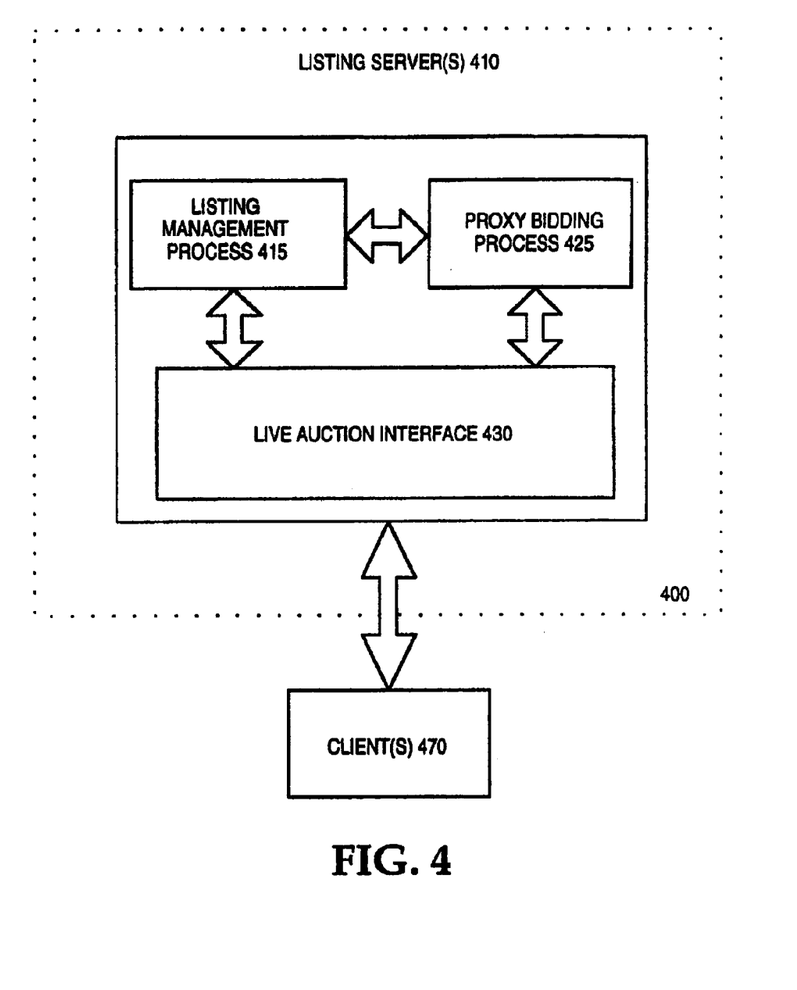
FIG. 4 is a high level illustration of the interaction between various devices and processes according to one embodiment of the present invention.

FIG. 4 is a high level illustration of the interaction between various devices and processes according to one embodiment of the present invention. According to the embodiment depicted, an online auction site 400 may comprise one or more listing servers 410. In this example, the listing servers 410 include a listing management process 415, a proxy bidding process 425, and a live auction interface 430. Clients 470 interact with the listing management process 415 and the proxy bidding process 425 to view information about items for sale and submit proxy prices, respectively.

The listing management process 415 interacts with online bidders and provides them with information about the items in which they are interested. The listing management process 415 may support a text-based item listing format, such as that depicted in FIG. 2, and/or a Gallery™ presentation format that includes thumbnail images of the items for sale as described in co-pending U.S. patent application Ser. No. 09/177,726, entitled "Information Presentation and Management in an Online Trading Environment" and assigned to the assignee of the present invention (GALLERY is a trademark of eBay Inc. of San Jose, Calif.).

The proxy bidding process 425 tracks the maximum amounts that online bidders are willing to pay for the items 210. Based upon the maximum amounts provided, the proxy bidding process 425 automatically submits bids on behalf on the online bidders as other bidders (online or on-site bidders) increase the bid price.

The live auction interface 430 provides an interface by which online bids may be communicated to the on-site bidders and live bids may be communicated to the proxy bidding process 425 and updated on various online auction site screens.

While, in order to facilitate explanation, the listing servers 410 are generally discussed as if they were a single device, in actuality, the listing servers 410 may comprise multiple physical and/or logical devices connected in a distributed architecture, and the various functions performed may actually be distributed among multiple devices. For example, any function can be implemented on any number of machines or on a single machine. Also, any process may be divided across multiple machines.

Exemplary Stages of an Integrated Auction

Figure 5:
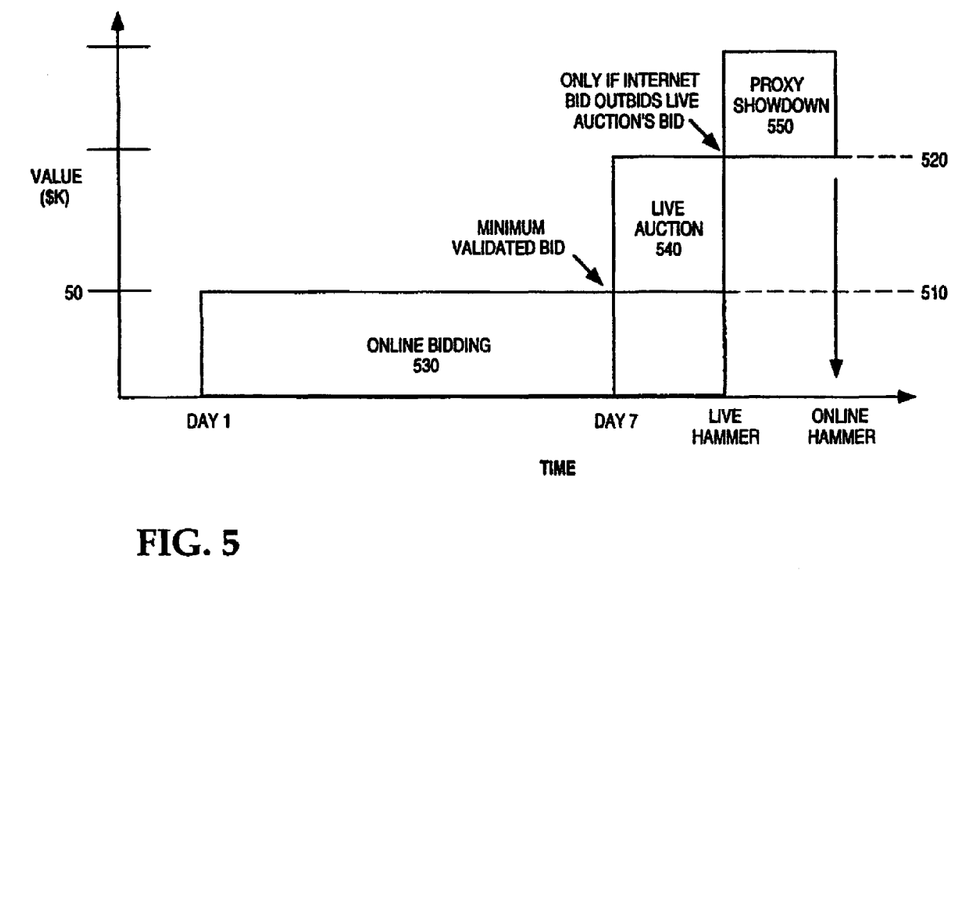
FIG. 5 conceptually illustrates the stages of an integrated auction according to one embodiment of the present invention.

FIG. 5 conceptually illustrates the stages of an integrated auction according to one embodiment of the present invention. In this example, an integrated auction comprises three separate and distinct stages: a pre-auction bidding stage 530, a live auction stage 540, and a proxy showdown stage 550. Bidding results may be fed from one stage to the next and the results from a previous stage may serve as the floor for the following stage. For example, an initial round of online bidding 530 taking place over a predetermined period of time may establish a starting bid 510 for the live auction stage 540. At the conclusion of the live auction stage 540, if one or more online bidders have submitted maximum proxy prices that are greater than the final bid from the live auction stage 540, the proxy showdown stage 550 is triggered in which the live auction continues until the maximum proxy price has been met.

Integrated Auction Flow

Figure 6:
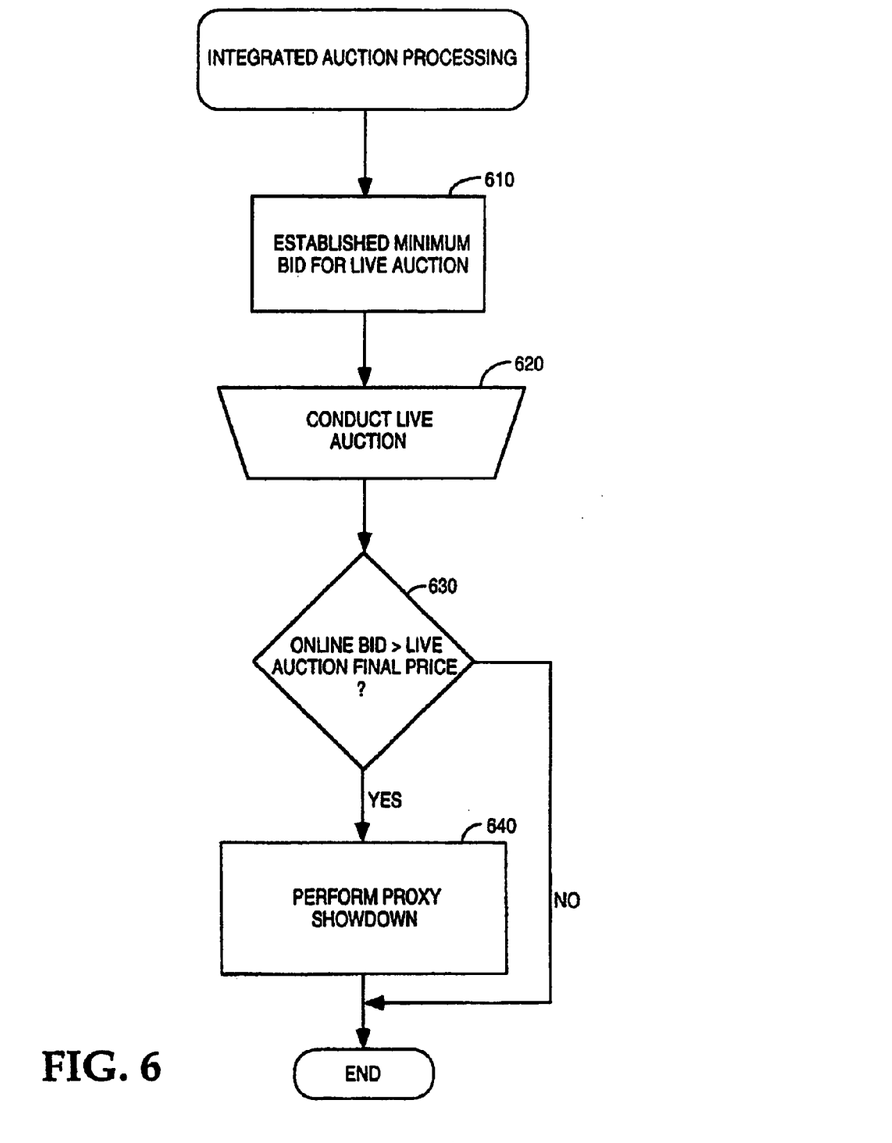
FIG. 6 is a flow diagram illustrating integrated auction processing according to one embodiment of the present invention.

Referring now to the flow diagram of FIG. 6, exemplary integrated auction processing will now be described. At step 610, a minimum bid for the live auction stage 540 is established by an online auction site 400. For example, one or more online bidders may submit maximum bid amounts to the proxy bidding process 425 to have the proxy bidding process 425 bid on their behalf. Other bidders may choose to monitor the pre-auction bidding stage 530 and periodically submit bids. When the predetermined time period for the pre-auction bidding stage 530 expires, the highest bid is presented to the auction house via the live auction interface 430. In this manner, the starting bid for the live auction stage 540 is established in a new and exciting way, thereby creating additional hype about the auction. At step 620, the auction house conducts a live auction starting the bidding at the dollar amount provided by the online auction site 400. During the live auction, live bids by the on-site bidders may be communicated to the online bidders via the live auction interface 430. Additionally, the online bidders may be provided with teleconferencing or other means of monitoring the progress of the live auction 540. At any rate, at the conclusion of the live auction, the final bid is input into the live auction interface 430. At step 630, a determination is made whether or not to perform a proxy showdown. If one or more online bidders have submitted a maximum proxy price greater than the highest bid from the live auction stage, then processing continues with step 640. Otherwise, the integrated auction is complete. At step 640, the on-site bidders are pitted against the one or more online bidders' proxies. As above, live bids are presented to the online auction site 400 via the live auction interface 430 to allow the online bidders to view near real-time updates. As explained previously, the proxy bidding process 425 will automatically bid on behalf of the online bidders as necessary until the maximum is exceeded. Therefore, step 640 continues until either all maximum proxy prices have been exceeded or until no further live bids are received.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method, comprising:
   prior to a live, in-person auction, establishing, in an online environment, a starting bid for an item by performing a pre-auction bidding process in the online environment for a predetermined amount of time,
   the pre-auction bidding process including,
      communicating information associated with the item to online bidders,
      receiving bids for the item from online bidders, and
      choosing as the starting bid a highest bid from the bids received;
   communicating the starting bid for the item to the live, in-person auction; and
   during the live, in-person auction, performing a live auction process including,
      updating, in the online environment, bidding information associated with the item, the updated bidding information to reflect a current bid associated with the item in the live, in-person auction,
      receiving a maximum bid amount from one of the online bidders, and
      submitting a proxy bid to the live, in-person auction on behalf of the online bidder, the proxy bid submitted against one or more live bidders that are participating in the live, in-person auction, the proxy bid based on the maximum bid amount.

2. A machine-readable medium having stored thereon data representing sets of instructions which, when executed by a machine, cause the machine to perform a method according to the method of claim 1.

3. The machine-readable medium of claim 2, wherein the communicating of the item to the online users includes providing access to catalog information for items available in the live, in-person auction, the catalog information to enable the online users to perform operations including searching the catalog information for the item, viewing the item, and bidding on the item during the pre-auction bidding process.

4. The machine-readable medium of claim 2, wherein the sets of instructions, which when executed by the machine, further cause the machine to provide the online users with an audio webcast of the live, in-person auction.

5. The machine-readable medium of claim 2, wherein the sets of instructions, which when executed by the machine, further cause the machine to provide the online users with a video webcast of the live, in-person auction.

6. The computer-implemented method of claim 1, wherein the communicating of the item to the online users comprises providing access to catalog information for items available in the live, in-person auction, to enable the online users to perform one or more of the following: search the catalog information for the item, view the item, and bid on the item during the pre-auction bidding process.

7. The computer-implemented method of claim 1, further comprising:
providing the online users with an audio webcast of the live, in-person auction.

8. The computer-implemented method of claim 1, further comprising:
providing the online users with a video webcast of the live, in-person auction.

9. A computer-implemented method, comprising:
prior to a live, in-person auction, establishing a starting bid for an item in an online environment by performing an interactive pre-auction bidding process in the online environment for a predetermined amount of time, the pre-auction bidding process including,
communicating information associated with the item to online bidders,
receiving bids for the item from the online bidders, and
choosing as the starting bid a highest bid from the bids received;
communicating the starting bid for the item to the live, in-person auction; and
performing a live, in-person auction process during the live, in-person auction.

10. The computer-implemented method of claim 9, wherein the performing of the live, in-person auction process includes,
updating bidding information associated with the item in the online environment to reflect a current bid associated with the item in the live, in-person auction,
receiving a maximum bid amount from an online bidder in the online environment, the maximum bid amount reflecting the online bidder's maximum proxy price, and
submitting a proxy bid to the live, in-person auction on behalf of the online bidder, the proxy bid submitted against one or more live bidders that are participating in the live, in-person auction, the proxy bid based on the maximum bid amount.

11. The computer-implemented method of claim 9, wherein the communicating of the item to the online users includes providing access to catalog information for items available in the live, in-person auction, the providing of the catalog information to enable the online users to perform operations including, searching the catalog information for the item, viewing the item, and bidding on the item during the pre-auction bidding process.

12. The computer-implemented method of claim 9, further comprising:
providing the online users with an audio webcast or a video webcast of the live, in-person auction.

13. A machine-readable medium having stored thereon data representing sets of instructions which, when executed by a machine, cause the machine to perform operations according to the method of claim 9.

14. The machine-readable medium of claim 13, wherein the sets of instructions which, when executed by the machine, further cause the machine to:
during the live, in-person auction, update, in the online environment, bidding information associated with the item to reflect a current bid associated with the item, the current bid being in the live, in-person auction,
receive a maximum bid amount from an online bidder in the online environment, and
submit a proxy bid to the live, in-person auction on behalf of the online bidder, the proxy bid submitted against one or more live bidders that are participating in the live, in-person auction, the proxy bid based upon the maximum bid amount.

15. The machine-readable medium of claim 13, wherein the communicating of the item to the online users includes providing access to catalog information for items available in the live, in-person auction, the catalog information to enable the online users to perform operations including searching the catalog information for the item, viewing the item, and bidding on the item during the pre-auction bidding process.

16. The machine-readable medium of claim 13, wherein the sets of instructions which, when executed by the machine, further cause the machine to provide the online users with an audio webcast or a video webcast of the live, in-person auction.

17. A system, comprising:
a storage medium; and
a processor coupled to the storage medium, the processor to perform operations according to the method of claim 9.

18. The system of claim 17, wherein the processor is further to:
during the live, in-person auction, update, in the online environment, bidding information associated with the item, the updated bidding information to reflect a current bid in the live, in-person auction, the current bid to be associated with the item,
receive a maximum bid amount from an online bidder in the online environment, and
submit a proxy bid to the live, in-person auction on behalf of the online bidder, the proxy bid for submission against one or more live bidders that are participating in the live, in-person auction, the proxy bid based on the maximum bid amount.

19. The system of claim 17, wherein the communicating of the item to the online users includes providing access to catalog information for items available in the live, in-person auction, the catalog information to enable the online users to perform operations including search searching the catalog information for the item, viewing the item, and bidding on the item during the pre-auction bidding process.

20. A system, comprising:
a storage device to store one or more routines for integrating an online bidding process with a live, in-person auction; and
a processor coupled to the storage device, the processor to execute the one or more routines, to provide feedback to online bidders in an online environment during the live, in-person auctions and to serve as a proxy bidder for the online bidders,
wherein the executing of the routines includes,
prior to the live, in-person auction, establishing a starting bid for an item in an online environment by performing a pre-auction bidding process in the online environment for a predetermined amount of time, the pre-auction bidding process including,
communicating information associated with the item to online bidders,
receiving bids for the item from the online bidders, and
choosing as the starting bid a highest bid from the bids received;
communicating the starting bid for the item to the live, in-person auction, during the live, in-person auction, performing a live auction process including
- providing feedback to the online bidders by updating, in the online environment, bidding information associated with the item, the updated bidding information to reflect a current bid associated with the item during the live, in-person auction, and performing proxy bidding by
- receiving a maximum bid amount from one or more of the online bidders, and
- submitting a proxy bid to the live, in-person auction on behalf of the one or more online bidders, the proxy bid submitted against one or more live bidders participating in the live, in-person auction, the proxy bid based on the maximum bid amount.

21. The system of claim 20, wherein the processor is further to provide access to catalog information for items available in the live, in-person auction, the catalog information to enable the online users to perform operations including, searching the catalog information for the item, viewing the item, and bidding on the item during the pre-auction bidding process.

22. The system of claim 20, wherein the submitting of the proxy bid to the live, in-person auction on behalf of the one or more online bidders includes submitting a bid amount for the item that exceeds the current bid for the item and is less than or equal to the maximum bid amount.

* * * * *

UNITED STATES PATENT AND TRADEMARK OFFICE
CERTIFICATE OF CORRECTION

| | |
|---|---|
| PATENT NO. | : 7,162,446 B1 |
| APPLICATION NO. | : 09/457466 |
| DATED | : January 9, 2007 |
| INVENTOR(S) | : Handler |

It is certified that error appears in the above-identified patent and that said Letters Patent is hereby corrected as shown below:

In column 8, line 42, in Claim 19, after "including" delete "search".

In column 8, line 52, in Claim 20, delete "auctions" and insert -- auction, --, therefor.

Signed and Sealed this

Twenty-seventh Day of March, 2007

JON W. DUDAS
*Director of the United States Patent and Trademark Office*